(12) United States Patent
Yamada et al.

(10) Patent No.: US 8,944,196 B2
(45) Date of Patent: Feb. 3, 2015

(54) WHEEL BEARING APPARATUS INCORPORATED WITH AN IN-WHEEL MOTOR

(71) Applicant: NTN Corporation, Osaka (JP)

(72) Inventors: Tomoya Yamada, Iwata (JP); Syougo Suzuki, Iwata (JP)

(73) Assignee: NTN Corporation, Osaka-shi (JP)

( * ) Notice: Subject to any disclaimer, the term of this patent is extended or adjusted under 35 U.S.C. 154(b) by 1 day.

(21) Appl. No.: 13/629,790

(22) Filed: Sep. 28, 2012

(65) Prior Publication Data

US 2013/0049439 A1 Feb. 28, 2013

Related U.S. Application Data

(63) Continuation of application No. PCT/JP2011/057888, filed on Mar. 29, 2011.

(30) Foreign Application Priority Data

Mar. 30, 2010 (JP) .................. 2010-077966

(51) Int. Cl.
*B60K 7/00* (2006.01)
*B60B 35/12* (2006.01)
(Continued)

(52) U.S. Cl.
CPC ............... *B60B 35/125* (2013.01); *B60B 7/00* (2013.01); *B60B 7/066* (2013.01);
(Continued)

(58) Field of Classification Search
CPC .... B60K 7/00; B60K 7/0007; B60B 27/0005; B60B 27/0015; B60B 27/0026; B60B 27/0073; B60B 27/0084; B60B 27/0094;
F16C 19/18; F16C 19/186; F16C 33/76; F16C 33/768; F16C 35/063; F16C 35/125; F16H 1/28; F16J 15/10; F16J 15/021
USPC ............... 180/65.51, 65.6; 301/6.5; 475/159; 277/551, 572–577, 632; 138/89; 220/804

See application file for complete search history.

(56) References Cited

U.S. PATENT DOCUMENTS 3,239,281 A * 3/1966 White ........................... 384/299
3,635,369 A * 1/1972 Lasswell et al. .............. 220/804
(Continued)

FOREIGN PATENT DOCUMENTS

| EP | 2 127 902 | 12/2009 |
|---|---|---|
| JP | 2002-120506 | 4/2002 |

(Continued)

OTHER PUBLICATIONS

Raw machine translation of JP-2002-120506.*

*Primary Examiner* — J. Allen Shriver, II
*Assistant Examiner* — Steve Clemmons
(74) *Attorney, Agent, or Firm* — Harness, Dickey & Pierce, P.L.C.

(57) ABSTRACT

A wheel bearing apparatus incorporating an in-wheel motor has a connecting shaft. The connecting shaft has a disc portion, forming the planetary elements, and a shaft portion, axially extending from the disc portion, via a shoulder portion. The outer circumference of the shaft portion has a serration. The connecting shaft is inserted into the wheel hub until the disc portion abuts the inner member. A seal ring, formed of elastic material, is interposed between the inner member and the connecting shaft to shield the driving portion from the outside in a liquid-tight manner.

6 Claims, 7 Drawing Sheets

(51) Int. Cl.
*B60B 7/00* (2006.01)
*B60B 7/06* (2006.01)
*B60B 27/00* (2006.01)
*B60K 17/04* (2006.01)
*F16C 19/18* (2006.01)
*F16C 33/76* (2006.01)
*F16C 35/063* (2006.01)
*H02K 7/08* (2006.01)
*H02K 7/116* (2006.01)
*F16C 19/55* (2006.01)
*H02K 5/10* (2006.01)
*F16H 1/28* (2006.01)

(52) U.S. Cl.
CPC ........ *B60B 27/0005* (2013.01); *B60B 27/0026* (2013.01); *B60B 27/0057* (2013.01); *B60B 27/0073* (2013.01); *B60B 27/0084* (2013.01); *B60B 27/0094* (2013.01); *B60K 7/0007* (2013.01); *B60K 17/046* (2013.01); *F16C 19/186* (2013.01); *F16C 33/768* (2013.01); *F16C 35/063* (2013.01); *H02K 7/083* (2013.01); *H02K 7/116* (2013.01); *F16C 19/55* (2013.01); *B60K 2007/0038* (2013.01); *B60K 2007/0092* (2013.01); *H02K 5/10* (2013.01); *F16H 1/28* (2013.01); *Y02T 10/641* (2013.01)
USPC ....... 180/65.51; 180/65.6; 475/159; 277/573; 301/6.5; 301/6.1

(56) References Cited

U.S. PATENT DOCUMENTS

| | | | | |
|---|---|---|---|---|
| 2007/0181357 | A1* | 8/2007 | Saito et al. | 180/65.5 |
| 2009/0252447 | A1* | 10/2009 | Hirai et al. | 384/513 |
| 2010/0038958 | A1* | 2/2010 | Tsuzaki et al. | 301/125 |
| 2010/0074568 | A1* | 3/2010 | Uchiyama | 384/480 |
| 2010/0092122 | A1* | 4/2010 | Fukumura et al. | 384/544 |

FOREIGN PATENT DOCUMENTS

| | | | |
|---|---|---|---|
| JP | 2002120506 A * | 4/2002 | B60B 35/14 |
| JP | 2005-231564 | 9/2005 | |
| JP | 2008-081090 | 4/2008 | |
| JP | 2008-296841 | 12/2008 | |
| JP | 2009-139286 | 6/2009 | |
| JP | 2009-214676 | 9/2009 | |
| JP | 2009214676 A * | 9/2009 | |
| JP | 2009-234289 | 10/2009 | |
| JP | 2009-248647 | 10/2009 | |
| JP | 2009-262624 | 11/2009 | |
| JP | 04-394736 | 1/2010 | |
| JP | 2010-000919 | 1/2010 | |
| WO | WO2009/072266 | 6/2009 | |
| WO | WO2009/113252 | 9/2009 | |
| WO | WO2009/119313 | 10/2009 | |

* cited by examiner (a)   (b)

(a)

(b)

US 8,944,196 B2

WHEEL BEARING APPARATUS INCORPORATED WITH AN IN-WHEEL MOTOR

CROSS-REFERENCE TO RELATED APPLICATIONS

This application is a continuation of International Application No. PCT/JP2011/057888, filed Mar. 29, 2011, which claims priority to Japanese Application No. 2010-077966, filed Mar. 30, 2010. The disclosures of the above applications are incorporated herein by reference.

FIELD

The present disclosure relates to a wheel bearing apparatus that rotationally supports a wheel of a vehicle and, more particularly, to a wheel bearing apparatus incorporating an in-wheel motor, formed from a combination of a wheel bearing, a reduction gear and an electric motor, intended to improve sealing performance and durability.

BACKGROUND

In recent years, there is a tendency that the driving form of an automobile has shifted from a conventional driving form, using an internal combustion engine, to a driving form using an electric motor. Under the circumstances, it has been noticed to use, as the wheel bearing apparatus for an electric vehicle, a wheel bearing apparatus incorporating an in-wheel motor with a combination of a wheel bearing, a reduction gear and an electric motor. The use of the wheel bearing apparatus incorporating an in-wheel motor for a driving wheel of an electric vehicle enables a remarkable reduction in weight and size of the vehicle. This is due to the elimination of bulky and complicated power transmitting mechanisms comprised of conventional parts such as a propeller shaft, a differential gear etc.

One example of a wheel bearing apparatus incorporating an in-wheel motor is shown in FIG. 8. The wheel bearing apparatus incorporating an in-wheel motor includes a wheel bearing 51, a planetary reduction gear 52 mounted on the wheel bearing 51, an electric motor M for driving the planetary reduction gear 52, and a driving portion 54 having a rotation member 53.

The wheel bearing 51 includes a wheel hub 56 having, on its one end, a wheel mounting flange 55 for mounting a wheel. The wheel hub outer circumference includes one inner raceway surface 56a. A cylindrical portion 56b axially extends from the inner raceway surface 56a. An inner ring 57 is press-fit onto the cylindrical portion 56b of the wheel hub 56. The inner ring outer circumference includes the other inner raceway surface 57a. An outer member 58 has an integrally formed body mounting flange 58b on its outer circumference. The body mounting flange 58b secures the outer member 58. The outer member inner circumference includes double row outer raceway surfaces 58a, 58a that oppose the inner raceway surfaces 56a, 57a. Double row rolling elements 59, 59 are freely rollably contained between the outer and inner raceway surfaces.

The planetary reduction gear 52 includes a sun gear 60 arranged on a rotation member 53, internal teeth 58c formed on the inner circumference of the outer member 58, multiple planetary gears 61 mating with the internal teeth 58c and the external teeth 60a of the sun gear 60, and carrier pins 63 that rotationally support the planetary gears 61 relative to the connecting shaft 62.

The driving portion 54 includes a cup-shaped stator housing 64 forming the electric motor M and separably arranged on the outer member 58. A stator portion 65 is built in the stator housing 64. A rotor portion 66 is secured on the rotation member 53 and is arranged opposite to the stator portion 65 via a predetermined air gap. The connecting shaft 62 is connected to the wheel hub 56, via serrations 62a, to transmit the rotation of the electric motor M to the wheel hub 56, via the planetary reduction gear 52 and the connecting shaft 62 so as to drive the wheel.

Such a prior art structure of the wheel bearing apparatus is able to keep a sufficient space for the wheel bearing 51. Also, it enables easy separation of the wheel bearing 51, the planetary reduction gear 52 and the driving portion 54 from each other in order to replace them. This makes it unnecessary to replace the whole unit for service. Thus, this reduces both the resource and the maintenance cost. (See e.g., Japanese Laid-open Patent Publication No. 231564/2005).

However, the prior art wheel bearing apparatus has the following problems. Since the sealability between the wheel hub 56 and the connecting shaft 62 is imperfect, lubricant contained within the driving portion 54 tends to leak to the outside. Accordingly, the leaked lubricant may affect the ambient environment or adhere to adjacent brake parts.

SUMMARY

It is, therefore, an object of the present disclosure to provide a wheel bearing apparatus incorporating an in-wheel motor that can improve sealability and durability of the wheel bearing apparatus used in an electric vehicle.

To achieve the above object of the present disclosure, a wheel bearing apparatus incorporating an in-wheel motor comprises a wheel bearing; a planetary reduction gear mounted on the wheel bearing; an electric motor for driving the planetary reduction gear; and a driving portion having a rotation member. The wheel bearing includes an outer member integrally formed with a body mounting flange on its outer circumference. The outer member inner circumference includes double row outer raceway surfaces. An inner member comprises a wheel hub and at least one inner ring. The wheel hub is integrally formed, on its one end, with a wheel mounting flange for mounting a wheel. The wheel hub outer circumference includes an axially extending cylindrical portion. The wheel hub inner circumference includes a serration for torque transmission. The inner ring is press-fit onto the cylindrical portion of the wheel hub. The inner member outer circumference includes the inner raceway surfaces arranged opposite to the double row outer raceway surfaces. Double row rolling elements are freely rollably contained between the outer and inner raceway surfaces. The planetary reduction gear comprises an input element arranged on the rotation member. A stationary element is arranged on the inner circumference of the outer member. Multiple planetary elements are arranged between the stationary element and the input element. Output elements rotationally support the planetary elements relative to a connecting shaft. The driving portion comprises a stator housing forming the electric motor. The stator housing arranged on the outer member. A stator portion is built into the stator housing. A rotor portion is secured on the rotation member and arranged opposite to the stator portion, via a predetermined air gap. The connecting shaft is detachably connected to the wheel hub, via serrations, to transmit the rotation of the electric motor to the wheel hub, via the planetary reduction gear, so as to drive the wheel. The connecting shaft comprises a disc portion forming the planetary elements. A shaft portion axially extends from the disc portion, via a shoulder portion. The shaft portion outer circumference includes the serration. The connecting shaft is inserted into the wheel hub until the disc portion abuts the inner member. A seal ring, formed of elastic material, is interposed between the inner member and the connecting shaft to shield the driving portion from the outside in a liquid-tight manner.

A wheel bearing apparatus incorporating an in-wheel motor comprises a wheel bearing, a planetary reduction gear mounted on the wheel bearing, an electric motor for driving the planetary reduction gear, and a driving portion having a rotation member. A connecting shaft is detachably connected to the wheel hub, via serrations, to transmit the rotation of the electric motor to the wheel hub, via the planetary reduction gear, so as to drive the wheel. The connecting shaft comprises a disc portion forming the planetary elements. A shaft portion axially extends from the disc portion, via a shoulder portion. The shaft portion outer circumference includes the serration. The connecting shaft is inserted into the wheel hub until the disc portion abuts the inner member. A seal ring, formed of elastic material, is interposed between the inner member and the connecting shaft to shield the driving portion from the outside in a liquid-tight manner. Thus, it is possible to provide a wheel bearing apparatus incorporating an in-wheel motor that prevents lubricant contained in the driving portion from leaking to the outside through the connecting shaft. This improves sealability and durability.

The planetary reduction gear comprises a sun gear, multiple planetary gears and carrier pins. The sun gear is arranged on the rotation member. The multiple planetary gears mate with the external teeth of the sun gear and with the internal teeth formed on the inner circumference of the outer member. The carrier pins projects from the periphery of the connecting shaft to rotationally support the planetary gears. This makes it possible to achieve efficient power transmission without any sliding contact.

The inner ring is axially immovably secured by a caulked portion. The caulked portion is formed by plastically deforming the end of the cylindrical portion of the wheel hub. The end of the caulked portion is flattened and the disc portion abuts against the flattened surface of the caulked portion. This improves the sealability of the wheel bearing apparatus.

A cylindrical portion is formed on the inner circumference of the caulked portion. A shoulder portion of the connecting shaft is inserted into the cylindrical portion, via a predetermined radial gap. An annular groove is formed around the shoulder portion of the connecting shaft. The seal ring is fit into the annular groove so that it elastically contacts the cylindrical portion. The seal ring is interposed between the caulked portion and the connecting shaft.

The seal ring comprises an annular disc shaped contact portion, a flange portion and multiple claw portions. The flange portion axially extends from the periphery of the contact portion. The multiple claw portions extend radially inward from the flange portion. The tip ends of the claw portions circumscribe a circle with a diameter smaller than the outer diameter of the caulked portion. The claw portions can be elastically fit on the caulked portion. This prevents the seal ring from falling off from the caulked portion during transporting steps or assembling steps.

The multiple claw portions are arranged equidistantly along the flange portion. This makes it possible to easily mount the seal ring on the caulked portion in a quick-attach manner.

The surface roughness of the end surface of the caulked portion and the disc portion is made at Ra 1.6 or less. This suppresses wear of the seal ring and thus improves its durability.

The seal ring is formed of synthetic resin with impregnated fibrous reinforcement. This enables the seal ring to exhibit sufficient reinforcing effect while preventing a reduction of the toughness of the seal ring. Also, it prevents breakage of the seal ring during mounting onto the caulked portion.

The seal ring is used to close an outer-side opening of the wheel hub. The seal ring comprises a metal core, a bottom portion and a sealing member. The metal core includes a cylindrical fitting portion adapted to be press-fit into the outer-side opening of the wheel hub. The bottom portion extends radially inward from the fitting portion. The sealing member is formed of synthetic resin.

The tip end portion of the fitting portion of the metal core is formed with a reduced outer diameter smaller than the outer diameter of a base portion of the fitting portion. The sealing member is adhered to the metal core so that it extends to the outer surface of the tip end portion of the fitting portion. The outer diameter of the sealing member, lying on the tip end portion of the metal core, is slightly larger than that of the sealing member lying on the base portion of the fitting portion. This improves the sealability of the wheel bearing apparatus.

The wheel bearing apparatus incorporating an in-wheel motor of the present disclosure comprises a wheel bearing; a planetary reduction gear mounted on the wheel bearing; an electric motor driving the planetary reduction gear; and a driving portion with a rotation member. The wheel bearing has an outer member integrally formed, on the outer circumference, with a body mounting flange. The outer member inner circumference includes double row outer raceway surfaces. An inner member has a wheel hub and at least one inner ring. The wheel hub is integrally formed, on its one end, with a wheel mounting flange to mount a wheel. The wheel hub outer circumference has an axially extending cylindrical portion. The wheel hub inner circumference includes a torque transmitting serration. The inner ring is press-fit onto the cylindrical portion of the wheel hub. The inner member outer circumference includes the inner raceway surfaces arranged opposite to the double row outer raceway surfaces. Double row rolling elements are freely rollably contained between the outer and inner raceway surfaces. The planetary reduction gear includes an input element arranged on the rotation member; a stationary element arranged on the inner circumference of the outer member; multiple planetary elements arranged between the stationary element and the input element; and output elements rotationally supporting the planetary elements relative to a connecting shaft. The driving portion includes a stator housing forming the electric motor and arranged on the outer member; a stator portion built in the stator housing; and a rotor portion secured on the rotation member and arranged opposite to the stator portion, via a predetermined air gap. The connecting shaft is detachably connected to the wheel hub, via serrations, to transmit the rotation of the electric motor to the wheel hub, via the planetary reduction gear, so as to drive the wheel. The connecting shaft comprises a disc portion and a shaft portion. The disc portion forms the planetary elements. The shaft portion axially extends from the disc portion, via a shoulder portion. The shaft portion outer circumference includes the serration. The connecting shaft is inserted into the wheel hub until the disc portion abuts the inner member. A seal ring, formed of elastic material, is interposed between the inner member and the connecting shaft to shield the driving portion from the outside in a liquid-tight manner. Thus, it is possible to provide a wheel bearing apparatus incorporating an in-wheel motor that can prevent lubricant contained in the driving portion from leaking to the outside through the connecting shaft. This improves sealability and reliability.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
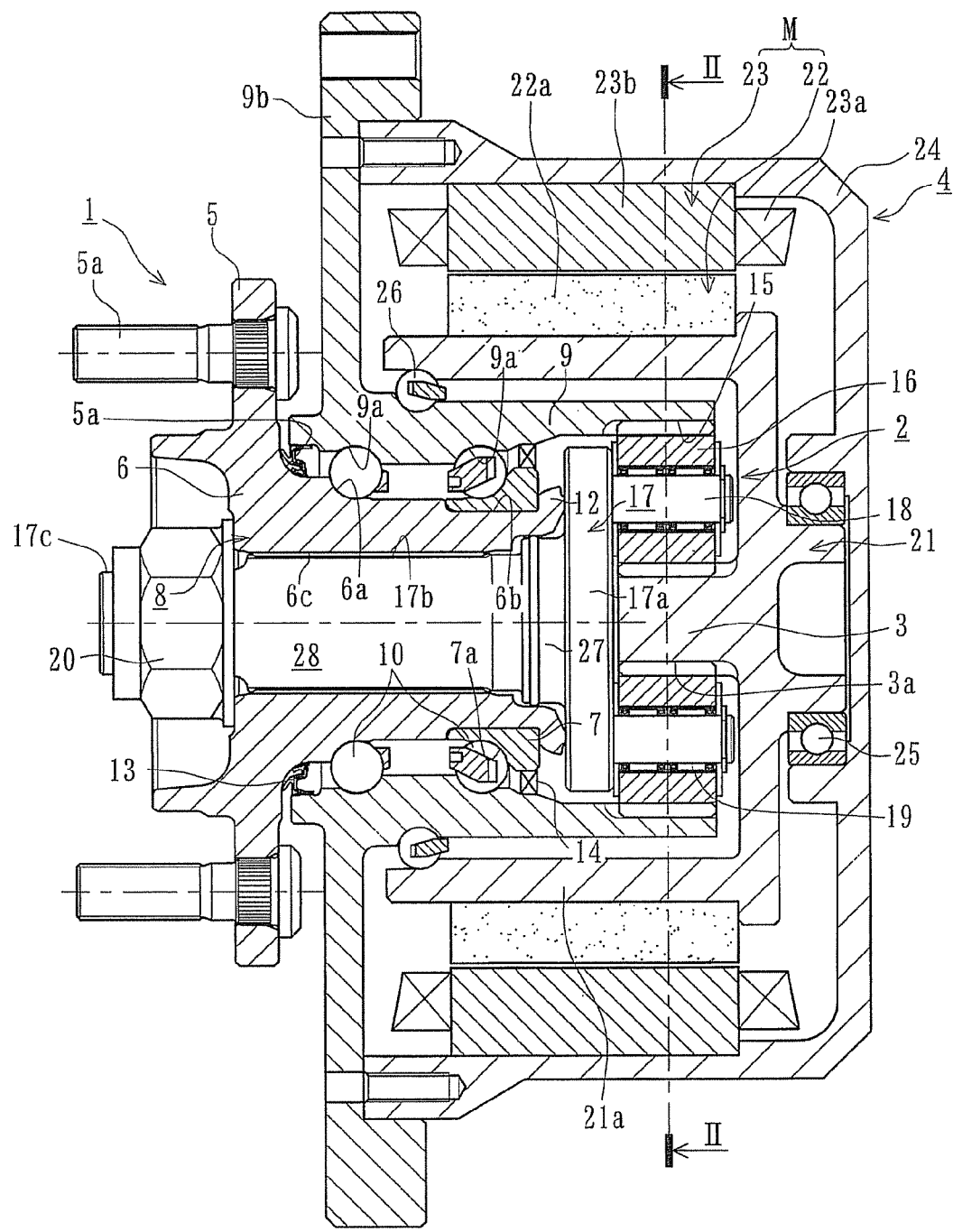
FIG. 1 is a longitudinal section view of a first embodiment of a wheel bearing apparatus incorporating an in-wheel motor.

A preferable mode for carrying out the present disclosure is a wheel bearing apparatus incorporating an in-wheel motor comprising a wheel bearing; a planetary reduction gear mounted on the wheel bearing; an electric motor for driving the planetary reduction gear; and a driving portion having a rotation member. The wheel bearing includes an outer member integrally formed on the outer circumference with a body mounting flange. The outer member inner circumference includes double row outer raceway surfaces. An inner member has a wheel hub and an inner ring. The wheel hub is integrally formed, on its one end, with a wheel mounting flange to mount a wheel. The wheel hub outer circumference includes one inner raceway surface opposing one of the double row outer raceway surfaces. A cylindrical portion axially extends from the inner raceway surface. The wheel hub inner circumference includes a torque transmitting serration. The inner ring is press-fit onto the cylindrical portion of the wheel hub. The inner ring outer circumference includes the other inner raceway surface opposing the other double row outer raceway surface. Double row rolling elements are freely rollably contained between the outer and inner raceway surfaces. The planetary reduction gear includes a sun gear arranged on the rotation member. Multiple planetary gears mate with external teeth of the sun gear and internal teeth formed on the inner circumference of the outer member. Carrier pins project from the periphery of the connecting shaft and rotationally support the planetary gears. The driving portion includes a stator housing that forms the electric motor and is arranged on the outer member. A stator portion is built in the stator housing. A rotor portion is secured on the rotation member and is arranged opposite to the stator portion, via a predetermined air gap. The inner ring is axially secured by a caulked portion. The caulked portion is formed by plastically deforming the end of the cylindrical portion of the wheel hub. The connecting shaft is fit into the wheel hub via serrations to transmit the rotation of the electric motor to the wheel hub, via the planetary reduction gear, so as to drive the wheel. The connecting shaft includes a disc portion and a shaft portion. The disc portion forms the planetary elements. The shaft portion axially extends from the disc portion via a shoulder portion. The shaft portion outer circumference includes the serration. The end of the caulked portion is flattened. The disc portion abuts the flattened surface of the caulked portion. A cylindrical portion is formed on the inner circumference of the caulked portion. A shoulder portion of the connecting shaft is inserted into the cylindrical portion, via a predetermined radial gap. An annular groove is formed around the shoulder portion of the connecting shaft. The seal ring is fit into the annular groove so that it elastically contacts the cylindrical portion.

Preferable embodiments of the present disclosure will be described in detail with reference to the drawings.

Figure 2:
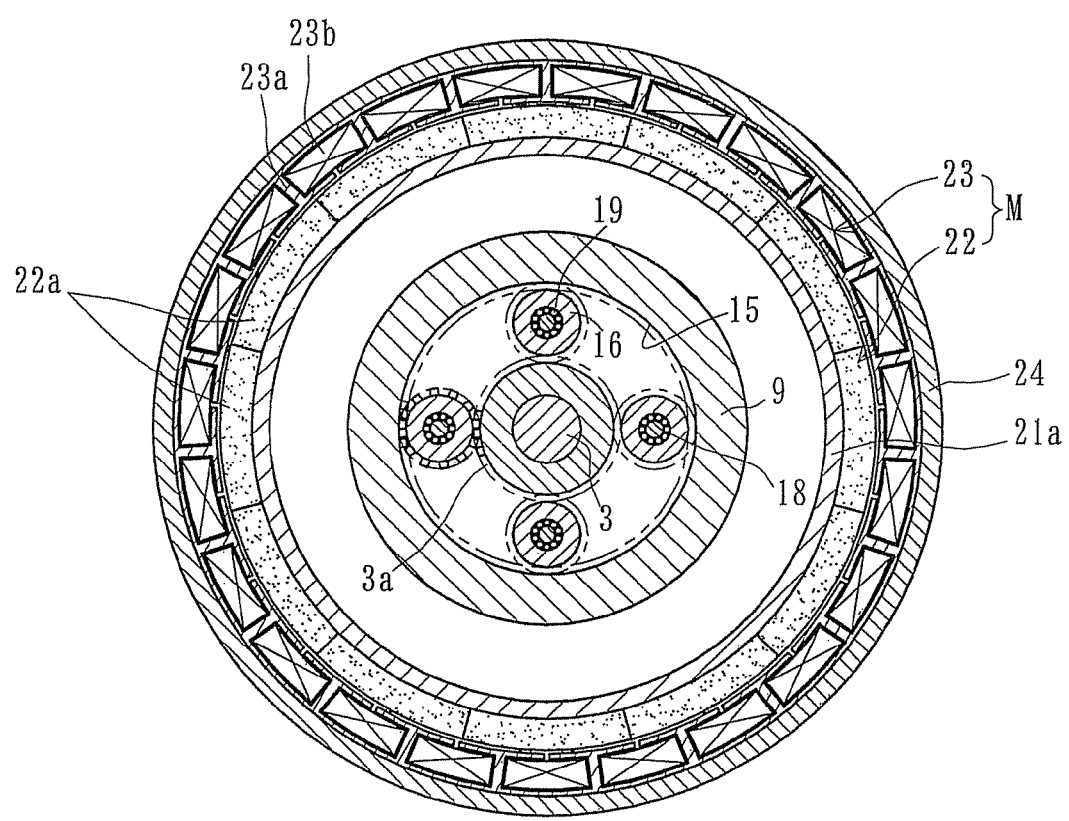
FIG. 2 is a cross-section view taken along line II-II of FIG. 1.
Figure 3:
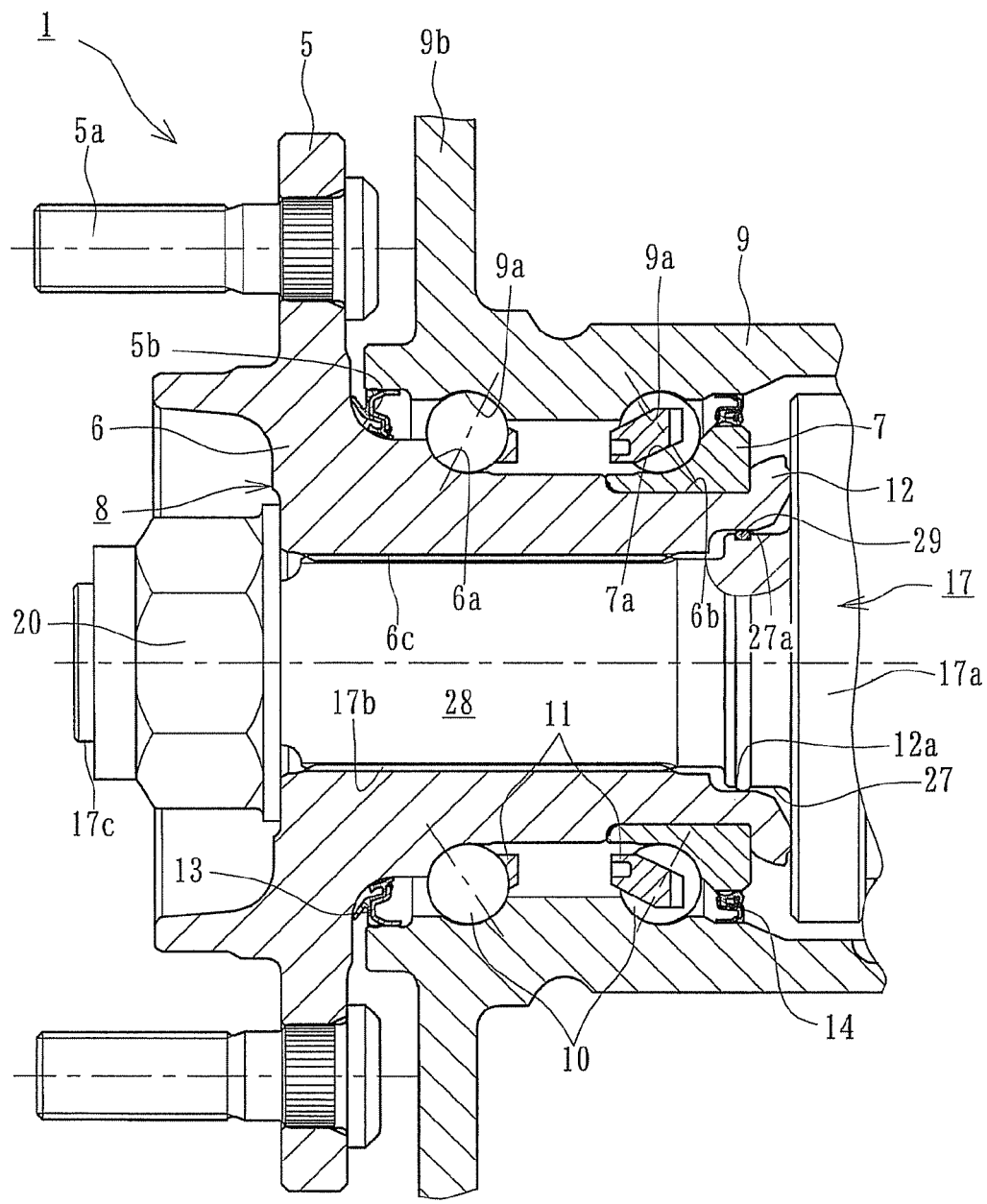
FIG. 3 is a longitudinal section view of the wheel bearing apparatus incorporating an in-wheel motor of FIG. 1.

FIG. 1 is a longitudinal section view of a first embodiment of a wheel bearing apparatus incorporating an in-wheel motor. FIG. 2 is a cross-section view taken along line II-II of FIG. 1. FIG. 3 is a longitudinal section view of the wheel bearing apparatus incorporating an in-wheel motor of FIG. 1. In the description below, an outer side of a wheel bearing apparatus, when it is mounted on a vehicle, is referred to as the "outer side" (the left side in FIG. 1) and an inner side of a wheel bearing apparatus is referred to as the "inner side" (the right side in FIG. 1).

The wheel bearing apparatus incorporating an in-wheel motor mainly includes a wheel bearing 1, a planetary reduction gear 2 mounted on the wheel bearing 1, and a driving portion 4. The driving portion 4 is integrally formed with a sun gear 3 that forms part of the planetary reduction gear 2.

The wheel bearing 1 is a third generation type to support a driving wheel (not shown). As shown in FIG. 3, the wheel bearing 1 includes an inner member 8 with a wheel hub 6 and an inner ring 7. The wheel hub 6 is integrally formed, on its outer-side end, with a wheel mounting flange 5 to mount a wheel. The wheel hub outer circumference includes one (outer-side) inner raceway surface 6a. A cylindrical portion 6b axially extends toward the inner-side from the inner raceway surface 6a. The inner ring 7 is formed, on its outer circumference with the other (inner-side) inner raceway surface 7a. The inner ring 7 is press-fit onto the cylindrical portion 6b of the wheel hub 6. An outer member 9 is integrally formed, on the outer circumference, with a body mounting flange 9b. The flange 9b is secured on a body of a vehicle (not shown). The outer member inner circumference includes double row outer raceway surfaces 9a, 9a opposite to the double row inner raceway surfaces 6a, 7a. Double row rolling elements (balls) 10, 10 are freely rollably contained between the outer and inner raceway surfaces. Cages 11, 11 equidistantly hold the rolling elements 10, 10 along a circle. Hub bolts 5a are equidistantly arranged along the periphery of the wheel mounting flange 5.

The inner ring 7 is made of high carbon chrome steel such as SUJ2. It is hardened to its core by dip quenching to have a surface hardness of 58~64 HRC. The inner ring 7 is press-fit onto the cylindrical portion 6b of the wheel hub 6, via a predetermined interference. This forms a double row angular contact ball bearing of the back-to-back duplex type. The inner ring is axially secured relative to the wheel hub 6 under a predetermined bearing pre-stressed condition by a caulked portion 12. The caulked portion 12 is formed by plastically deforming the end of the cylindrical portion 6b.

The wheel hub 6 is made of medium/high carbon steel including carbon of 0.40~0.80% by weight such as S53C. It is hardened by high frequency induction quenching so that the inner raceway surface 6a and a region from an inner-side base 5b of the wheel mounting flange 5 to the cylindrical portion 6b has a hardness of 58~64 HRC. The caulked portion 12 remains as is with a hardness after forging. This enables the wheel hub 6 to have a sufficient mechanical strength against rotary bending loads applied to the wheel mounting flange 5. This improves the anti-fretting property of the cylindrical portion 6b to which the inner ring 7 is fit as well as to smoothly carry out the plastic deformation of the caulking portion 12 without causing micro-cracks. The rolling elements 10 are made of high carbon chrome steel such as SUJ2. They are hardened to their core by dip quenching to have a hardness of 58~64 HRC.

The outer member 9 is made of medium/high carbon steel including carbon of 0.40~0.80% by weight such as S53C. At least the double row outer raceway surfaces 9a, 9a are hardened by high frequency induction quenching to have a surface hardness of 58~64 HRC. Seals 13, 14 are mounted in annular space openings formed between the outer member 9 and the inner member 8. The outer-side seal 13 prevents leakage of lubricating grease sealed in the bearing and entry of rainwater or dust into the bearing from the outside. The inner-side seal 14 prevents leakage of grease sealed in the bearing and entry of lubricating oil contained in a driving portion 4, described below, into the inside of the bearing.

Although shown here as a wheel bearing with a double row angular contact ball bearing using balls as the rolling elements 10, the present disclosure is not limited to such a bearing. A double row tapered roller bearing, using tapered rollers as rolling elements, may be used. In addition, although shown here with the wheel bearing 1 as a third generation structure where the inner raceway surface 6a is directly formed on the outer circumference of the wheel hub 6, the present disclosure may be applied to a so-called second generation structure where a wheel hub is formed with a cylindrical portion including a pair of press-fit inner rings.

As shown in FIG. 1, the inner circumference of the inner-side end of the outer member (stationary element) 9 is formed with internal teeth 15. Four planetary gears (planetary element) 16 mate with the internal teeth 15 and with external teeth 3a of a sun gear (input element) 3. This arrangement forms the planetary reduction gear 2 of the planetary type.

Each planetary gear 16 is rotationally supported on a carrier pin 18 via a rolling bearing 19 (see FIG. 2). The carrier pins 18 projects from a disc portion 17a of a connecting shaft 17. The connecting shaft 17 outer circumference includes a serration (or spline) 17b that engages a serration (or spline) 6c formed on the inner circumference of the wheel hub 6. The shaft 17 transmits a torque to the wheel hub 6. An external thread 17c is formed on the connecting shaft 17 at the end of the serration 17b. The wheel hub 6 and the connecting shaft 17 are axially separably secured by a nut 20 fastened to the external thread 17c.

A rotation member 21 is formed with a substantially cup-shaped configuration. The rotation member 21 has a cylindrical portion 21a coaxial with the sun gear 3. A rotor portion 22, forming part of an electric motor M, is secured on the outer circumference of the cylindrical portion 21a. The rotor portion 22 includes multiple permanent magnets 22a. A stator portion 23 is secured on the inner circumference of the stator housing 24. The stator portion 23 is arranged opposite to the rotor portion 22 via a predetermined air gap. The stator portion 23 includes a stator iron core 23a and a stator coil 23b wound on the iron core 23a. The electric motor M is formed by the rotor portion 22 and the stator portion 23 (see FIG. 2). Although it is shown as one example that the sun gear 3 is directly formed on the rotation member 21, forming the driving portion 4, the present disclosure is not limited to this and can be applied to a separate sun gear secured on a rotation shaft mounted on the rotation member 21.

The rotation member 21 is rotationally supported relative to the stator housing 24 and the outer member 9, forming the stationary member, via rolling bearings 25, 26, respectively. The stator housing 24 is detachably secured to the body mounting flange 9b of the outer member 9 by securing bolts (not shown). The rotation member 21 can be rotated by energizing the electric motor M. The rotation of the rotation member 21 is transmitted to the planetary gears 16 via the sun gear 3. The rotation of the planetary gears 16 is further transmitted to the wheel hub 6 via the connecting shaft 17 to drive a wheel.

Although shown in this embodiment with a power transmitting mechanism using gears, the present disclosure is not limited to this and can be applied to a power transmitting mechanism using friction means (traction drive). The latter can suppress noise and vibration caused during power transmission.

In the present disclosure, the end surface of the caulked portion 12, for axially securing the inner ring 7, is flattened. The connecting shaft 17 is inserted into the wheel hub 6 until the disc portion 17a abuts the flattened surface of the caulked portion 12 as shown in FIG. 3. The connecting shaft 17 has a shaft portion 28 that extends from the disc portion 17a, via a shoulder portion 27. The shaft portion 28 outer circumference is formed with the serration 17b.

The inner circumference of the caulked portion 12 is formed as a cylindrical portion 12a. The shoulder portion 27 of the connecting shaft 17 is inserted into the cylindrical portion 12a, via a predetermined radial gap. An annular groove 27a is formed on the outer circumference of the shoulder portion 27. A seal ring 29, such as an O-ring, is fit into the annular groove 27a. The seal ring 29 elastically contacts the surface of the cylindrical portion 12a of the caulked portion 12. Thus the driving portion 4 (not shown in FIG. 3) can be shielded from the outside in a fluid-tight manner. Accordingly, it is possible to provide a wheel bearing apparatus incorporating an in-wheel motor that prevents the lubricant contained in the driving portion 4 from leaking to the outside through the connecting shaft 17. This improves sealability and durability.

The seal ring 29 is formed of synthetic rubber such as NBR (acrylonitrile-butadiene rubber). Its permanent compression strain of the physical property value of rubber is set at 40% or less at 120° C.×70 hour. Its TR 10 value (extension ratio: 50%) is set at −20° C. or less. Here, "TR 10 value" means recovery of strain of rubber in a low temperature region and substantially corresponds to degree of recovery of rubber elasticity ("TR" is abbreviation of "Temperature Retraction"). There are examples of material of the seal ring 29 other than NBR, such as HNBR (hydrogenation acrylonitrile-butadien rubber), EPDM (ethylene propylene rubber), ACM (poly-acrylic rubber) superior in heat resistance and chemical resistance, FKM (fluororubber) or silicone rubber.

Figure 4:
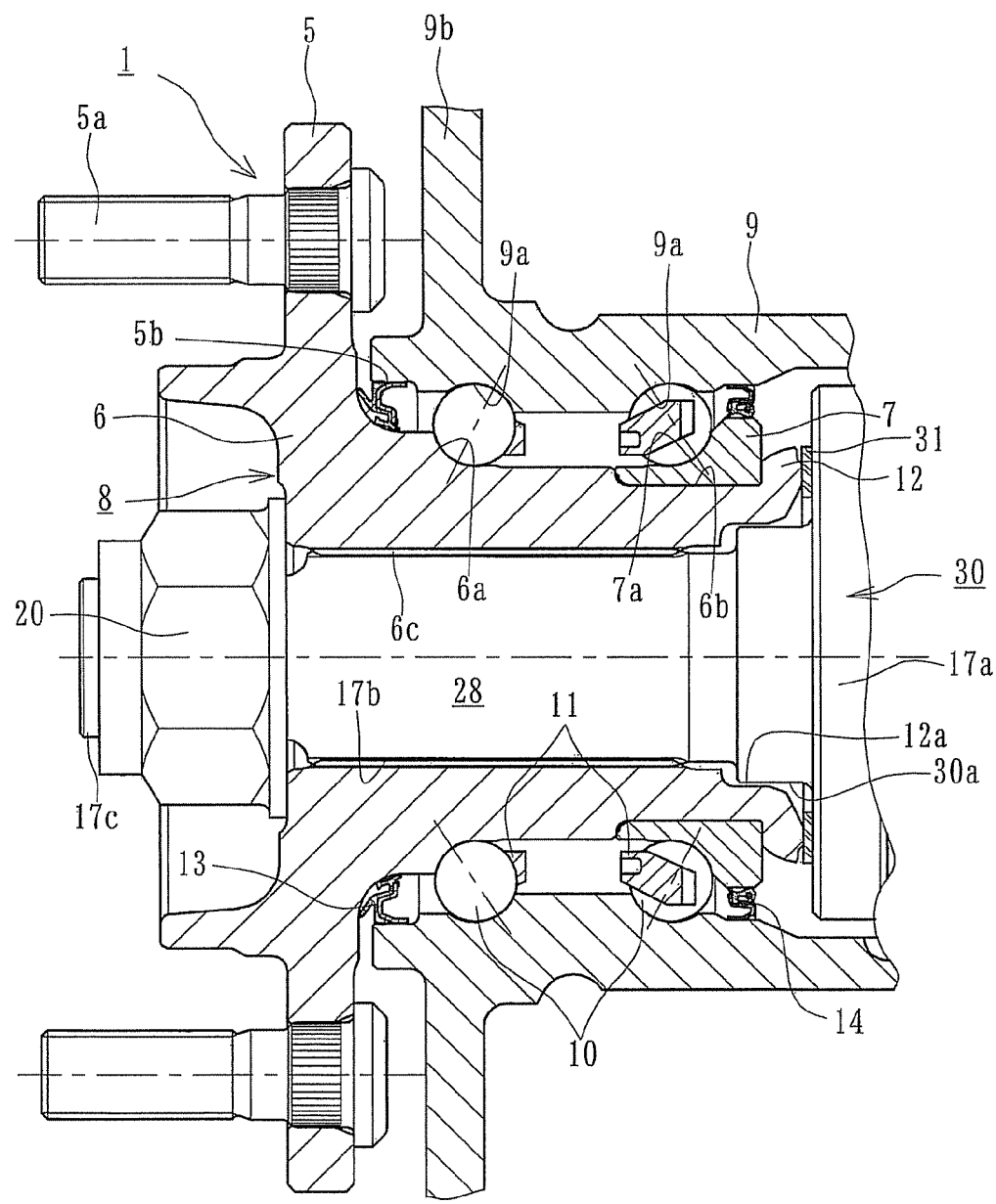
FIG. 4 is a longitudinal section view of a second embodiment of a wheel bearing apparatus incorporating an in-wheel motor.
Figure 5:
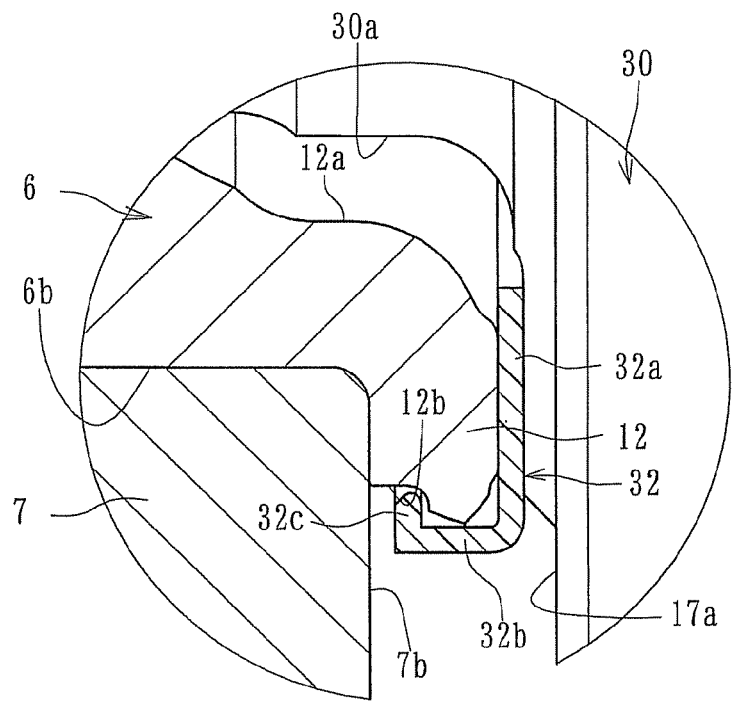
FIG. 5 is a partially enlarged view of a modification of FIG. 4.

FIG. 4 is a longitudinal section view of a second embodiment of a wheel bearing apparatus incorporating an in-wheel motor. FIG. 5 is a partially enlarged view of a modification of FIG. 4. FIG. 6(a) is a front elevation view of the seal ring of FIG. 5. FIG. 6(b) is a cross-section view taken along line VI-VI of FIG. 6(a). This embodiment is basically different from the first embodiment (FIG. 1) only in a structure of the connecting shaft. Accordingly, the same reference numerals are used in this embodiment to identify parts or portions having the same functions as those of the first embodiment.

This wheel bearing 1 is a so-called third generation type. It includes the inner member 8, the outer member 9, and the double row rolling elements 10, 10 rollably contained between the inner and outer members 8 and 9. The inner member 8 includes the wheel hub 6 and inner ring 7 press-fit onto the wheel hub 6 via a predetermined interference.

The wheel hub 6 is integrally formed on its outer-side end with the wheel mounting flange 5. The wheel hub outer circumference includes the inner raceway surface 6a. The cylindrical portion 6b axially extends from the inner raceway surface 6a. The inner ring 7 is formed, on its outer circumference, with the inner raceway surfaces 7a. The inner ring 7 is press-fit onto the cylindrical portion 6b of the wheel hub 6. The inner ring 7 is axially secured relative to the wheel hub 6 under a predetermined bearing pre-pressure by the caulked portion 12. The caulked portion 12 is formed by plastically deforming the end of the cylindrical portion 6b. Thus, this forms a double row angular contact ball bearing of the back-to-back duplex type.

The outer member 9 is integrally formed on the outer circumference with the body mounting flange 9b. The outer member inner circumference includes the double row outer raceway surfaces 9a, 9a opposite to the double row inner raceway surfaces 6a, 7a. The double row rolling elements 10, 10 are freely rollably contained between the outer and inner raceway surfaces and held by cages 11, 11. Seals 13, 14 are mounted in annular space openings formed between the outer member 9 and the inner member 8. The seals 13, 14 prevent leakage of grease sealed in the bearing to the outside of the bearing and entry of rainwater or dust into the bearing from the outside.

A shoulder portion 30a of the connecting shaft 30 is inserted into the cylindrical portion 12a of the caulked portion 12, via a predetermined radial gap. A seal ring 31 is sandwiched between the caulked portion 12 and the disc portion 17a of the connecting shaft 30. The seal ring is secured and sandwiched between them. Thus, similarly to the previous embodiment, it is possible to prevent lubricant contained in the driving portion 4 (not shown in FIG. 4) from leaking into the outside through the connecting shaft 17. This improves sealability and durability.

The seal ring 31 is made of thermoplastic synthetic resin such as PA (polyamide) 66. The seal ring 31 is formed by injection molding to have a donut-shaped configuration. Fibrous reinforcement such as GF (glass fiber) is mingled with the synthetic resin by 10~40% by weight and impregnated by a synthetic resin. An amount of the fibrous reinforcement less than 10% by weight is not preferable since sufficient reinforcing effect cannot be achieved. On the contrary, an amount of the fibrous reinforcement exceeding 40% by weight is also not preferable. This would cause anisotropic of fiber in a molded article and reduce its density, its dimensional stability as well as its toughness. Accordingly, this would cause breakage of the seal ring 31 when sandwiched between the caulked portion 12 and the disc portion 17a. In addition, the fibrous reinforcement is not limited to GF and other materials such as CF (carbon fiber), aramid fiber and boron fiber etc. may be applicable.

There are materials for the seal ring 31 other than PA 66, for example, thermoplastic synthetic resin called so-called engineering plastics such as PPA (polyphthalamide), PBT (polybutyleneterephthalate) etc., thermoplastic synthetic resin so-called super-engineering plastics such as polyphenylene sulfide (PPS), polyether etherketon (PEEK), polyamideimide (PAI) etc., or thermoset resins such as phenol resin (PF), epoxy resin (EP), polyimide resin (PI), etc.

The surface roughness of the end surface of the caulked portion 12 and the disc portion 17a of the connecting shaft 30 against which the seal ring 31 abuts is set at Ra 1.6 μm or less, preferably Ra 0.32 μm or less. This suppresses wear of the seal ring and improves its durability. Here, "Ra" is one of surface roughness parameters of JIS (JIS B0601-1994) which means the arithmetic average of absolute values of deviation from an average line.

FIG. 5 shows a modification of the seal ring. This seal ring 32 is mounted on the caulked portion 12. It is secured by being sandwiched between the caulked portion 12 and the disc portion 17a of the connecting shaft 30. The seal ring 32 includes an annular disc shaped contact portion 32a, a flange portion 32b and multiple claw portions 32c. The flange portion 32b axially extends from the periphery of the contact portion 32a. The multiple claw portions 32c extend radially inward from the flange portion 32b. The claw portions 32c of the seal ring 32 face the larger end face 7b of the inner ring 7, via an axial gap of max. 1 mm. This forms a labyrinth seal therebetween. This makes it possible to prevent the entry of foreign materials such as rain water or dust etc. Thus, this improves the durability of the wheel bearing while preventing the generation of rust on the caulked portion 12. In addition, it is also possible to prevent the lubricant contained in the driving portion 4 (not shown in FIGS. 5 and 6) from leaking into the outside through the connecting shaft 30. This improves sealability and durability of the wheel bearing.

Figure 6:
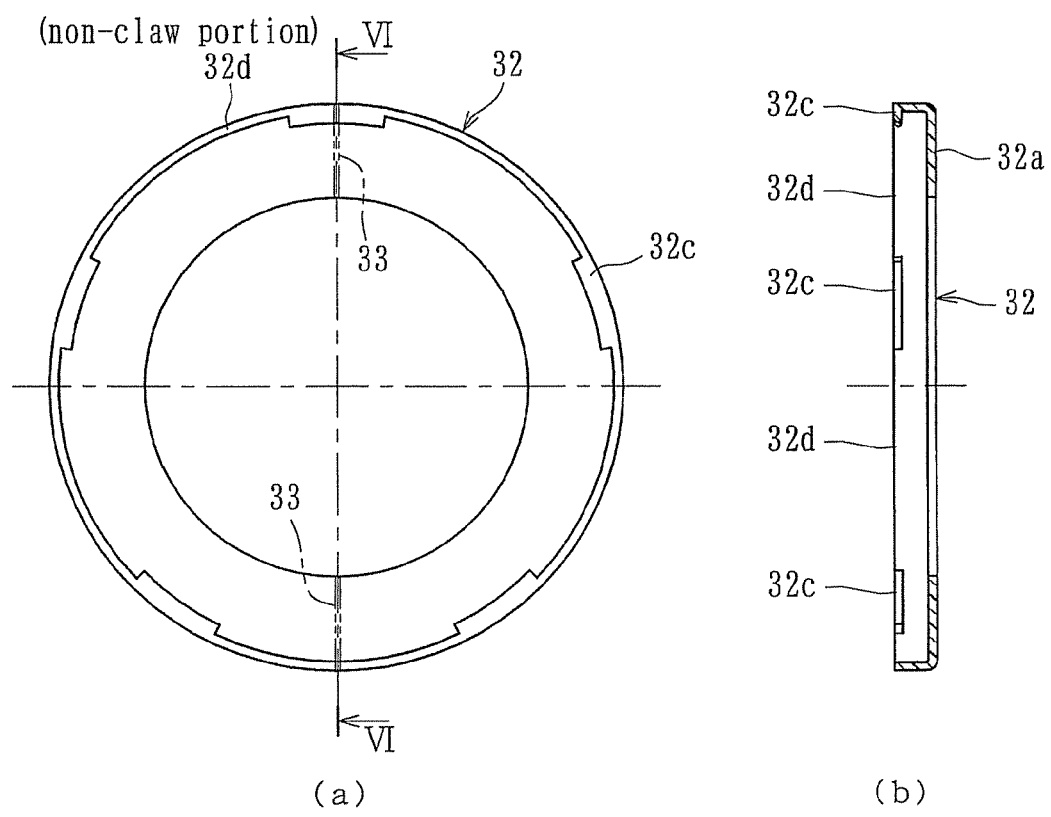
FIG. 6(a) is a front elevation view of the seal ring of FIG. 5.
FIG. 6(b) is a cross-section view taken along line VI-VI of FIG. 6(a)

In this embodiment, an annular recess 12b is formed by a lathe on the outer circumference of the caulked portion 12 facing the larger end face 7b of the inner ring 7. The claw portions 32c are adapted to be snapped into the annular recess 12b. As shown in FIG. 6, the claw portions 32c are formed in plural number (five are in the illustrated embodiment) equi-distantly along the periphery of the seal ring 32. The inner diameter of the claw portions 32c is slightly larger than the outer diameter of the annular recess 12b. The seal ring 32 can be fit into the annular recess 12b by elastically deforming the claw portions 32c and thus mounted onto the caulked portion 12. The use of such a seal ring 32 reduces the frictional coefficient of the contact surfaces of the caulked portion 12 and the disc portion 17a and thus reduces wear.

In addition, this structure of the seal ring 32 also enables easy elastic deformation of the claw portions 32c without strictly controlling the dimension of the claw portions 32c. Thus, the seal ring 32 may be mounted on the caulked portion 12 in a quick-attach manner. Accordingly, it is possible to improve the workability during assembly of the wheel bearing. Also, it is possible to prevent the seal ring 32 from falling off of the caulked portion 12 during transportation or assembly steps of the wheel bearing. Furthermore, since it is designed with a parting line 33, which is usually formed on the seal ring 32 during injection molding, it should be positioned at the center of the claw portion 32c or the non-claw portion 32d as shown in FIG. 6(a). Thus, it is possible to have high strength and rigidity as well as moderate elasticity of the seal ring 32.

Figure 7:
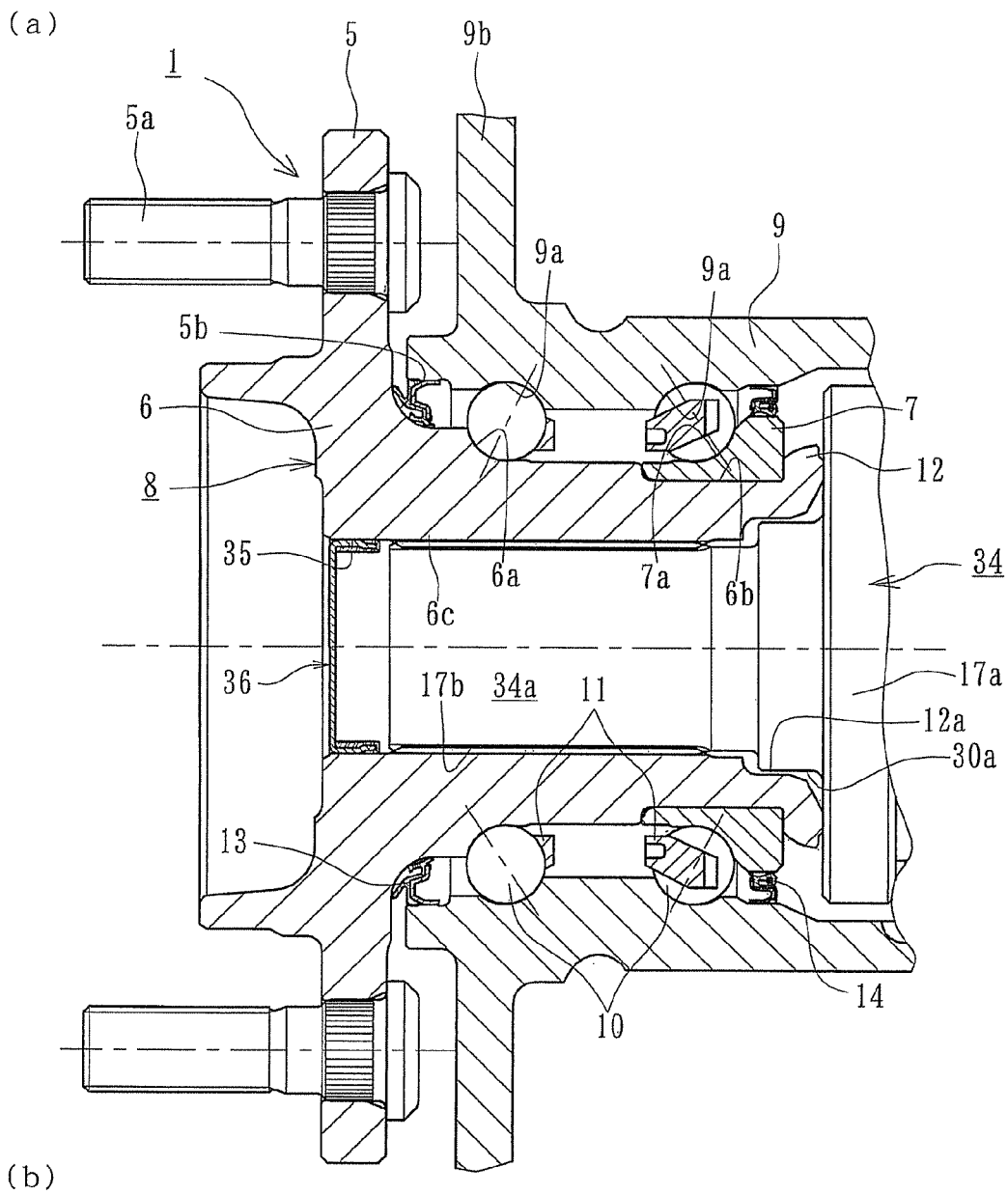
FIG. 7(a) is a longitudinal section view of a wheel bearing of a third embodiment of a wheel bearing apparatus incorporating an in-wheel motor.
FIG. 7(b) is an enlarged view of a seal ring of FIG. 7(a)
Figure 7:
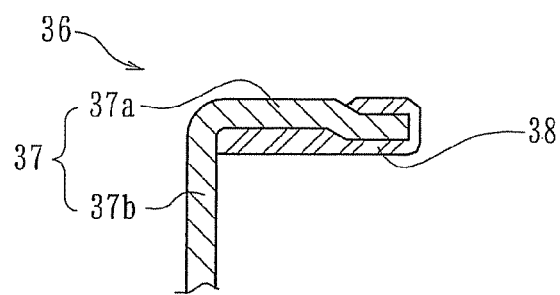
Figure 8:
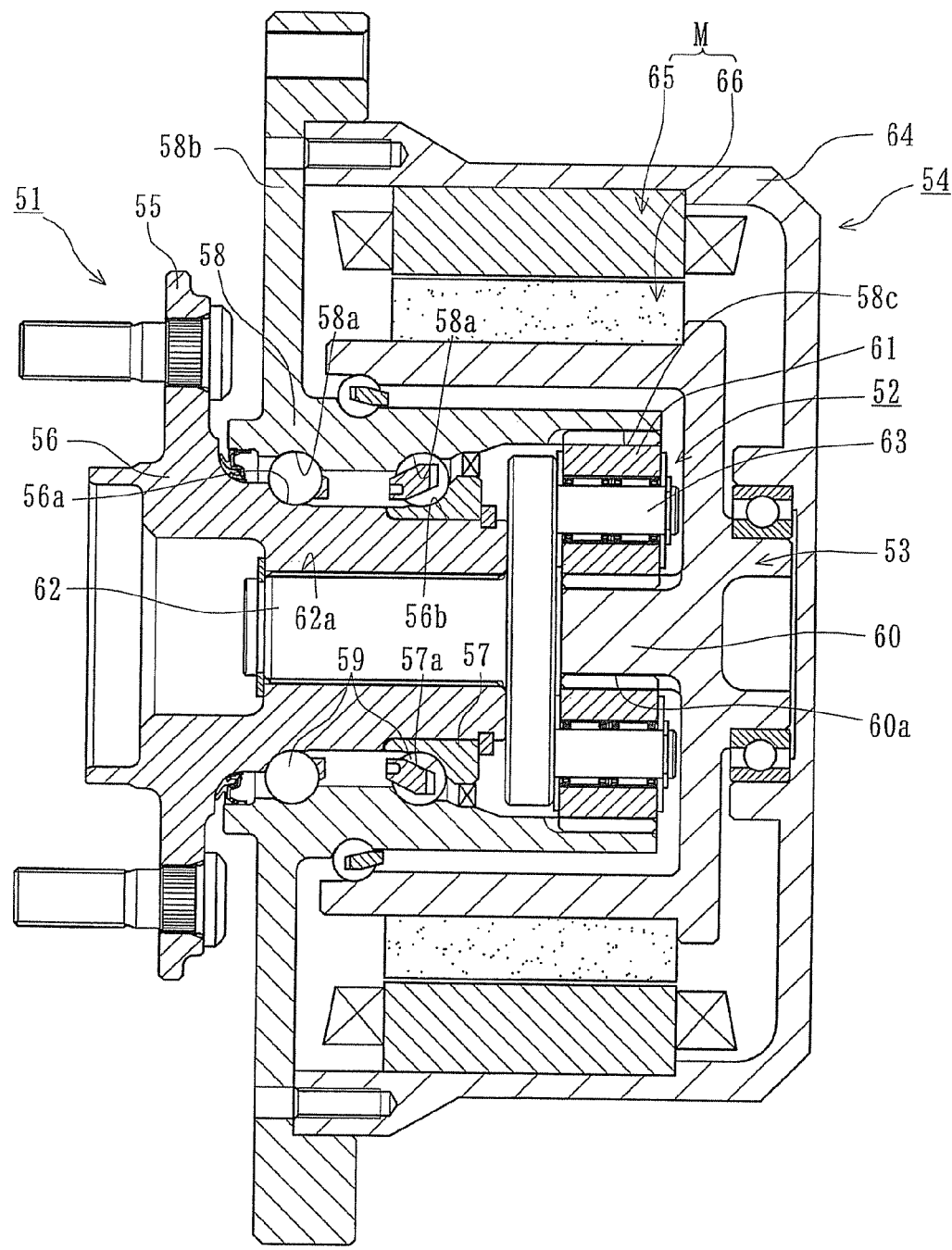
FIG. 8 is a longitudinal section view of a prior art wheel bearing apparatus incorporating an in-wheel motor.

FIG. 7(a) is a longitudinal section view of a wheel bearing of a third embodiment of a wheel bearing apparatus incorporating an in-wheel motor. FIG. 7(b) is an enlarged view of a seal ring of FIG. 7(a). This embodiment is basically different from the first embodiment (FIG. 1) only in a structure of the connecting shaft. Accordingly, the same reference numerals are used in this embodiment to identify parts or portions having the same functions as those of the first embodiment.

The wheel bearing 1 shown in FIG. 7(a) is a so called third generation type. The wheel bearing includes the inner member 8, the outer member 9, and the double row rolling elements 10, 10 rollably contained between the inner and outer members 8 and 9. The inner member 8 includes the wheel hub 6 and the inner ring 7 press-fit onto the wheel hub 6 via a predetermined interference.

In this embodiment, the connecting shaft 34 is formed with the disc portion 17a with projecting carrier pins (not shown). A shaft portion 34a axially extends from the disc portion 17a via a shoulder portion 30a. The connecting shaft 34 is inserted into the wheel hub 6 until the disc portion 17a abuts the caulked portion 12. The serration 17b of the shaft portion 34a engages the serration 6c of the wheel hub 6 to form a torque transmittable connection.

In this embodiment, a seal ring 36 is fit into an outer-side opening 35 of the wheel hub 6 adjacent to the outer-side end of the serration 6c close to the opening 35. As shown in the enlarged view of FIG. 7(b), the seal ring 36 includes a metal core 37 and a sealing member 38. The metal core 37 is adapted to be press-fit into the opening 35 of the wheel hub 6. The sealing member 38, of synthetic rubber such as NBR etc., is integrally adhered to the metal core 37 via vulcanized adhesion.

The metal core 37 is press-formed of preservative steel sheet such as austenitic stainless steel sheet (JIS SUS 304 etc.) or preserved cold rolled steel sheet (JIS SPCC etc.). The metal core has a generally cylindrical configuration with a "C"-shaped cross-section. It has a cylindrical fitting portion 37a and a bottom portion 37b. The fitting portion 37a is adapted to be press-fit into the outer-side opening 35 of the wheel hub 6. The bottom portion 37b extends radially inward from the fitting portion 37a.

The tip end portion of the fitting portion 37a of the metal core 37 is formed with a reduced outer diameter smaller than the outer diameter of a base portion of the fitting portion 37a. The sealing member 38 is adhered to the metal core 37 so that it extends to the outer surface of the tip end portion of the fitting portion 37a. The outer diameter of the sealing member 38 lies on the tip end portion of the metal core 37. The metal core 37 is slightly larger than that of the sealing member 38 lying on the base portion of the fitting portion 37a. Thus, similarly to the previous embodiments, it is possible to prevent the lubricant contained in the driving portion 4 (not shown in FIG. 7) from leaking into the outside through the connecting shaft 34. This improves the sealability of the wheel bearing. There are examples of materials of the sealing member 38 other than NBR, e.g. HNBR (hydrogenation acrylonitrile-butadiene rubber), EPDM (ethylene propylene rubber) etc. superior in heat resistance, ACM (poly-acrylic rubber) superior in heat resistance and chemical resistance, FKM (fluororubber) or silicone rubber.

The wheel bearing apparatus incorporating an in-wheel motor of the present disclosure can be applied to wheel bearing apparatus of the second and third generation types formed by a combination of a wheel bearing, a reduction gear, and an electric motor and structured so that the wheel bearing and the connecting shaft are detachably connected via a serration connection.

The present disclosure has been described with reference to the preferred embodiments. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A wheel bearing apparatus incorporating an in-wheel motor comprising:
    a wheel bearing;
    a planetary reduction gear mounted on the wheel bearing;
    an electric motor (M) for driving the planetary reduction gear; and
    a driving portion having a rotation member;
    the wheel bearing includes an outer member integrally formed on an outer circumference with a body mounting flange and the outer member inner circumference including double row outer raceway surfaces;
    an inner member includes a wheel hub and at least one inner ring; the wheel hub is integrally formed, on its one end, with a wheel mounting flange to mount a wheel, the inner member outer circumference includes an axially extending cylindrical portion, and the inner member inner circumference includes a torque transmitting serration, the inner ring is press-fit onto the cylindrical portion of the wheel hub, and the inner member outer circumference includes the inner raceway surfaces arranged opposite to the double row outer raceway surfaces;
    a caulked portion is formed by plastically deforming an end of the cylindrical portion of the wheel hub for axially securing the inner ring;
    double row rolling elements are freely rollably contained between the outer and inner raceway surfaces;
    the planetary reduction gear comprises:
    an input element arranged on the rotation member;
    a stationary element arranged on the inner circumference of the outer member;
    multiple planetary elements arranged between the stationary element and the input element;
    output elements rotationally support the planetary elements relative to a connecting shaft;
    the driving portion comprises:
        a stator housing forming a portion of the electric motor (M) and arranged on the outer member;
        a stator portion built in the stator housing; and
        a rotor portion secured on the rotation member and arranged opposite to the stator portion via a predetermined air gap;
    the connecting shaft is detachably connected to the wheel hub, via serrations, to transmit the rotation of the electric motor (M) to the wheel hub via the planetary reduction gear so as to drive the wheel;
    the connecting shaft comprises a disc portion forming the planetary elements, and a shaft portion axially extending from the disc portion via a shoulder portion, the connecting shaft outer circumference includes the serration;
    the connecting shaft is inserted into the wheel hub until the disc portion abuts the inner member such that the disc portion located in the radially inner direction of the outer member is in contact with the caulked portion of the wheel hub; and
    a seal ring is interposed adjacent the inner member and the connecting shaft to shield the driving portion from the outside in a liquid-tight manner.

2. The wheel bearing apparatus incorporating an in-wheel motor of claim 1, wherein the planetary reduction gear further comprises a sun gear arranged on the rotation member, the multiple planetary gears mate with external teeth of the sun gear and with internal teeth formed on the inner circumference of the outer member, and carrier pins project from the periphery of the connecting shaft to rotationally support the planetary gears.

3. The wheel bearing apparatus incorporating an in-wheel motor of claim 1, wherein the end of the caulked portion is flattened and the disc portion abuts with the flattened surface of the caulked portion.

4. The wheel bearing apparatus incorporating an in-wheel motor of claim 3, wherein a cylindrical portion is formed on the inner circumference of the caulked portion and a shoulder portion of the connecting shaft is inserted into the cylindrical portion via a predetermined radial gap, and an annular groove is formed around the shoulder portion of the connecting shaft, the seal ring is fit into the annular groove so that it elastically contacts the cylindrical portion.

5. The wheel bearing apparatus incorporating an in-wheel motor of claim 1, wherein the seal ring is used to close an outer-side opening of the wheel hub and the seal ring comprises a metal core including a cylindrical fitting portion adapted to be press-fit into the outer-side opening of the wheel hub, and a bottom portion extending radially inward from the fitting portion, and further including a sealing member formed from synthetic resin.

6. The wheel bearing apparatus incorporating an in-wheel motor of claim 5, wherein a tip end portion of the fitting portion of the metal core is formed with a reduced outer diameter smaller than the outer diameter of a base portion of the fitting portion, the sealing member is adhered to the metal core so that it extends to the outer surface of the tip end portion of the fitting portion, and the outer diameter of the sealing member lying on the tip end portion of the metal core is slightly larger than that of the sealing member lying on the base portion of the fitting portion.

* * * * *

UNITED STATES PATENT AND TRADEMARK OFFICE
CERTIFICATE OF CORRECTION

PATENT NO. : 8,944,196 B2
APPLICATION NO. : 13/629790
DATED : February 3, 2015
INVENTOR(S) : Tomoya Yamada et al.

It is certified that error appears in the above-identified patent and that said Letters Patent is hereby corrected as shown below:

Title Page, Item (71) Applicant, "Osaki (JP)" should be -- Osaki-shi (JP) --

Signed and Sealed this
Twenty-third Day of June, 2015

Michelle K. Lee
*Director of the United States Patent and Trademark Office*